(12) United States Patent
Yen

(10) Patent No.: US 7,490,791 B1
(45) Date of Patent: Feb. 17, 2009

(54) REEL STRUCTURE

(76) Inventor: Hsu-Li Yen, 3F-2, No. 13, Wu Chuan 1 Rd., Hsin Chuang City, Taipei Hsien (TW)

( * ) Notice: Subject to any disclaimer, the term of this patent is extended or adjusted under 35 U.S.C. 154(b) by 0 days.

(21) Appl. No.: 11/882,347

(22) Filed: Aug. 1, 2007

(51) Int. Cl.
*B65H 75/48* (2006.01)
(52) U.S. Cl. .................................. 242/378.1; 242/385.4
(58) Field of Classification Search .................. 242/378, 242/378.1, 385.4, 396.1
See application file for complete search history.

(56) References Cited

U.S. PATENT DOCUMENTS

| | | | | |
|---|---|---|---|---|
| 6,808,138 B2* | 10/2004 | Liao | .......................... | 242/378.1 |
| 7,222,811 B2* | 5/2007 | Chang | ..................... | 242/378.1 |
| 2002/0040945 A1* | 4/2002 | Stepancich et al. | ....... | 242/378.1 |

* cited by examiner

*Primary Examiner*—Sang Kim
(74) *Attorney, Agent, or Firm*—Rosenberg, Klein & Lee

(57) ABSTRACT

An improved reel is described. The reel includes two cords or wires, one of which is reeled in or out concurrently as the other is drawn out. Additionally, the length of cords or wires is adjusted to a desired level in multiple stages, and the cords or wires of such reel are collected smoothly and quickly.

1 Claim, 6 Drawing Sheets

![](US 7,490,791 B1)

REEL STRUCTURE

BACKGROUND OF THE INVENTION

1. Field of the Invention

The present invention generally relates to a reel, and more particularly, to an improved structure of a reel, which is used for control of reeling in and out the cords or wires of manifold devices such as electronic products, computers, phones, and communication equipment.

2. Description of Related Art

As the technology is progressed ceaselessly, the structures of computers, electric and communication equipment are developed to meet the requirements of the present market. However, it is always inconvenient to store the cords or wires of these devices. To solve the problem, various kinds of reels are provided to collect the cords or wires and control the length of cords or wires in use. Referring to FIG. 1, a reel 10 is utilized by pulling out the wires or cords 101 at two ends with hands, which is single-staged. That is, the reel 10 is not fixed until the cords thereof are completely drawn out. In order to roll up the cords 101, users need to drag and release the cords 101 at two ends simultaneously, and thereby the cords 101 are collected automatically. Another kind of reel 10 belongs to a multi-staged reel, in which the cords 101 are drawn out and fixed in multiple stages. Though the cords 101 can be fixed in multiple stages while being pulled, it is difficult to define the length of the cords 101 and it is still unfavorable to reel out the cords 101 at two ends concurrently because the process needs to be repeated several times for entire collection of the cords 101.

In view of the aforesaid disadvantages, an improved structure of a reel that satisfies the concerns of convenience and utility is investigated and provided in the application.

SUMMARY OF THE INVENTION

It is one object of the invention to provide a structure of a reel. The reel includes two cords or wires, one of which is reeled in or out concurrently as the other is drawn out. Additionally, the length of cords or wires is adjusted to a desired level in multiple stages if necessary, and the cords or wires of such reel are collected quickly and smoothly.

DETAILED DESCRIPTION OF THE INVENTION

Figure 1:
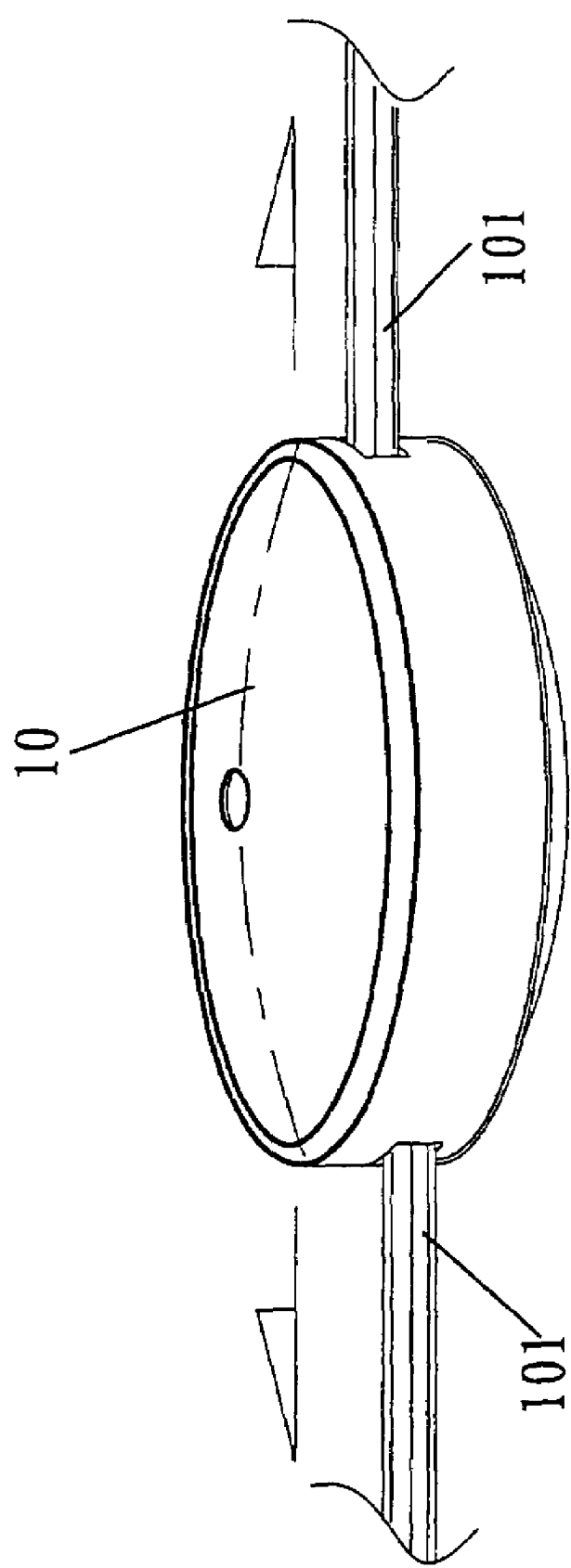
FIG. 1 illustrates a diagram of operating a conventional reel.
Figure 2:
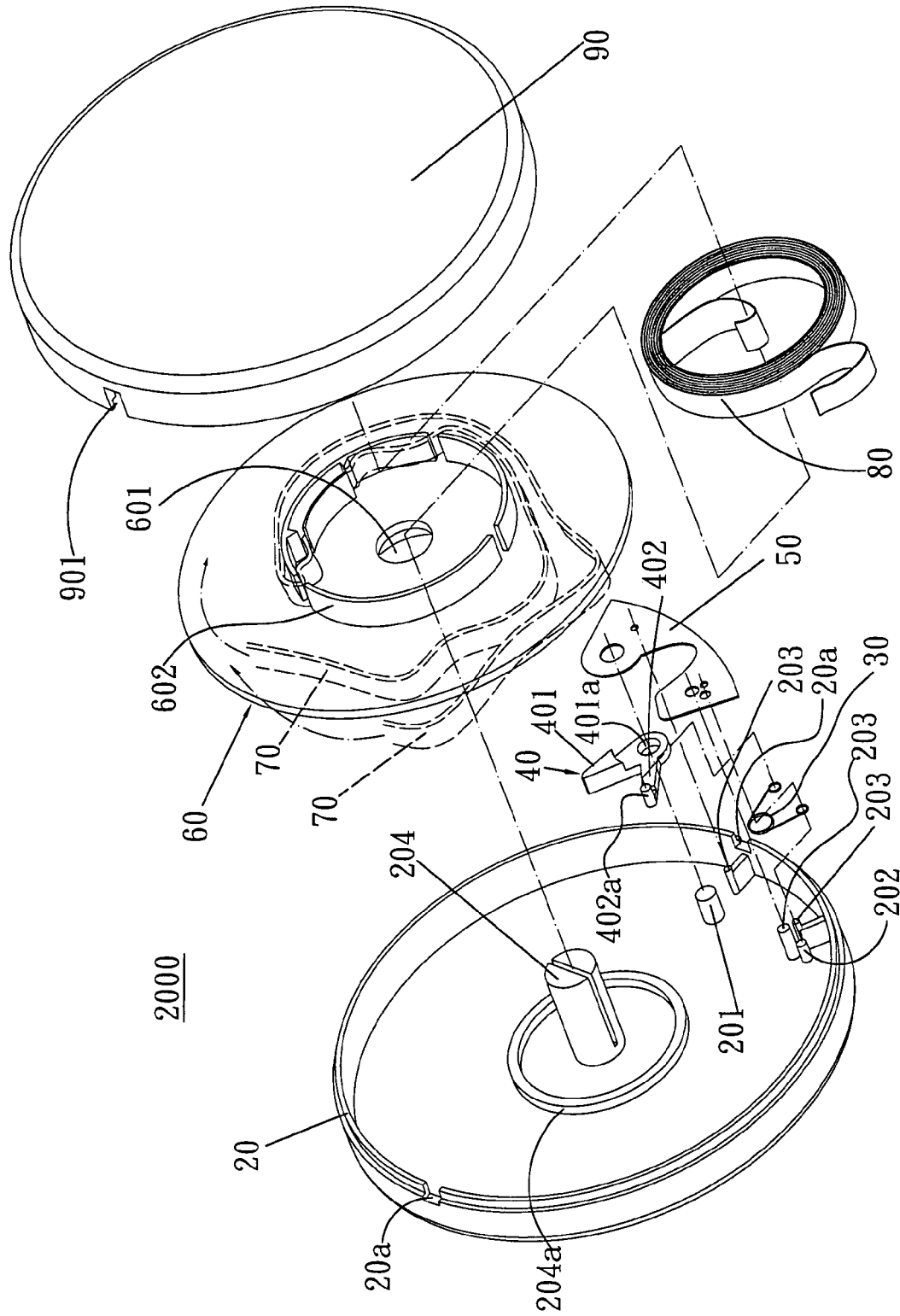
FIG. 2 illustrates a perspective, exploded diagram of various components in a reel according to an embodiment of the invention.

FIG. 2 is a perspective and exploded diagram illustrating various components of a reel structure according to an embodiment of the invention. As shown, the reel structure includes a base 20 with two openings 20a. An axial pillar 201 is disposed on the base 20, and a column 202 is spaced apart from the axial pillar 201. The base 20 further includes a plurality of plugs 203, a support 204 with a groove disposed in the middle of the base 20, and a bulged ring 204a.

A substantially V-shaped spring 30 is also provided.

A movable arm assembly 40 includes a movable arm 401 equipped with an axial hole 401a in the lower portion thereof. A spring arm 402 and a stud 402a are disposed on one side of the movable arm 401.

A clasper 50 with a concave portion in the middle is provided. The clasper 50 further includes a plurality of fastening holes corresponding to the axial pillar 201, the column 202 and the plugs 203.

Figure 3:
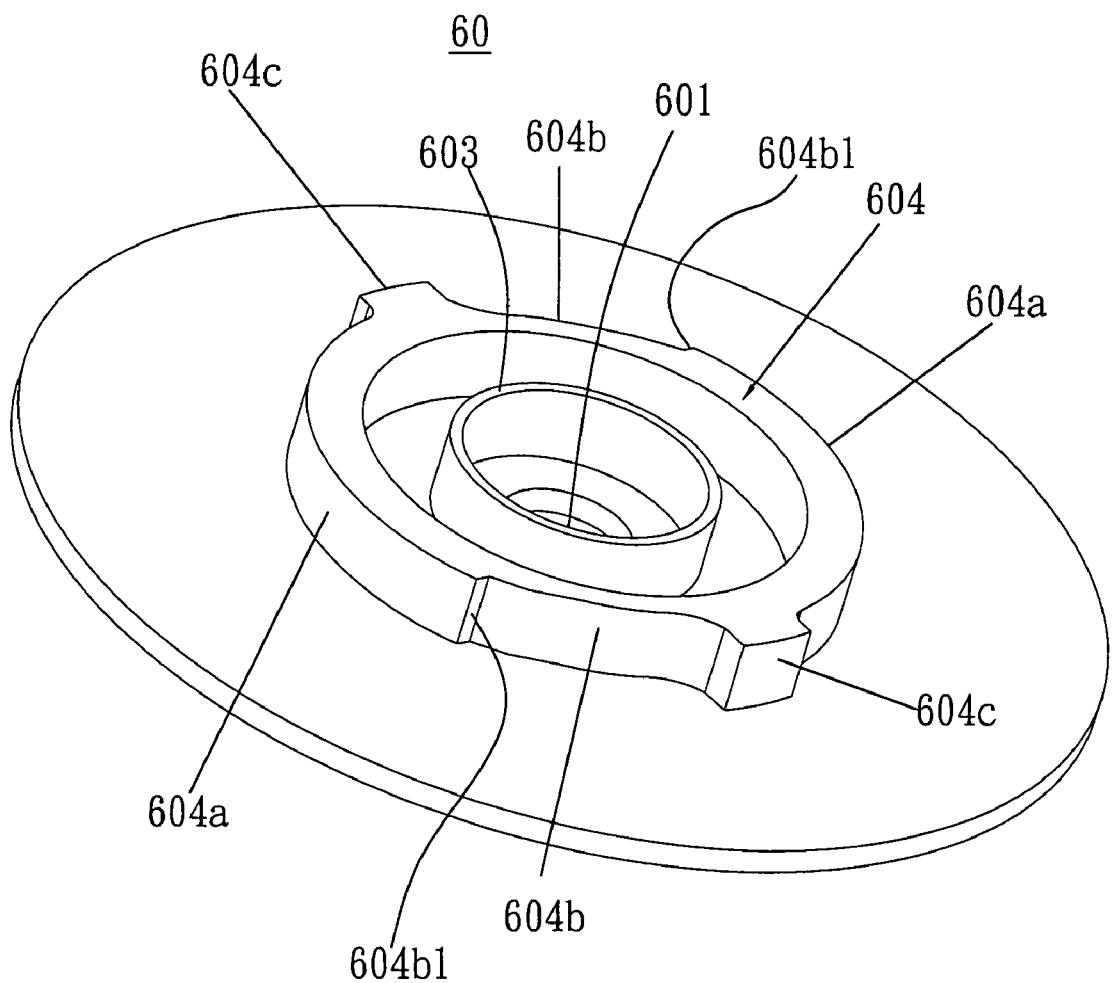
FIG. 3 illustrates a perspective, exploded diagram of the bottom of a rotating disc according to an embodiment of the invention.

A rotating disc 60 is provided with an axial hole 601 in its center. A surrounding wall 602 is disposed on the upper portion of the rotating disc 60, and the wires or cords 70 are wedged therein. These two cords 70 are wound along the outside of the surrounding wall 602 in the same direction. A coil spring 80 is positioned in the middle of the surrounding wall 602. Referring to FIG. 3, a bugled ring 603 and a bugled track assembly 604 are disposed at the middle bottom of the rotating disc 60. The bugled track assembly 604 includes two cambered movable tracks 604a, two concave switchable tracks 604b and two bumps 604c connected therewith. The switchable track 604b further includes a counter surface 604b1 for pushing.

In addition, there is a cap 90 with two openings 901.

The axial pillar 201 on the base 20 is inserted into the axial hole 401a of the movable arm assembly 40. One end of the spring 30 is attached to the column 202 of the base 20, and the other end is coupled to the stud 402a disposed on the spring arm 402 of the movable arm assembly 40. The fastening holes of the clasper 50 respectively mate with the axial pillar 201, the column 202 and the plugs 203, so as to avoid the separation of the movable arm assembly 40 from the spring 30 and to allow some movement therebetween. The support 204 on the base 20 is inserted into the axial hole 601 of the rotating disc 60 correspondingly such that the rotating disc 60 is rotatable about the support 204. The inner portion of the coil spring 80 disposed in the middle of the surrounding wall 602 on the rotating disc 60 is inset in the groove of the support 204. The cap 90 then covers the present structure. As a result, the cords 70 protrude the openings 901 of the cap 90 and the openings 20a of the base 20 to constitute a reel 2000.

Figure 4:
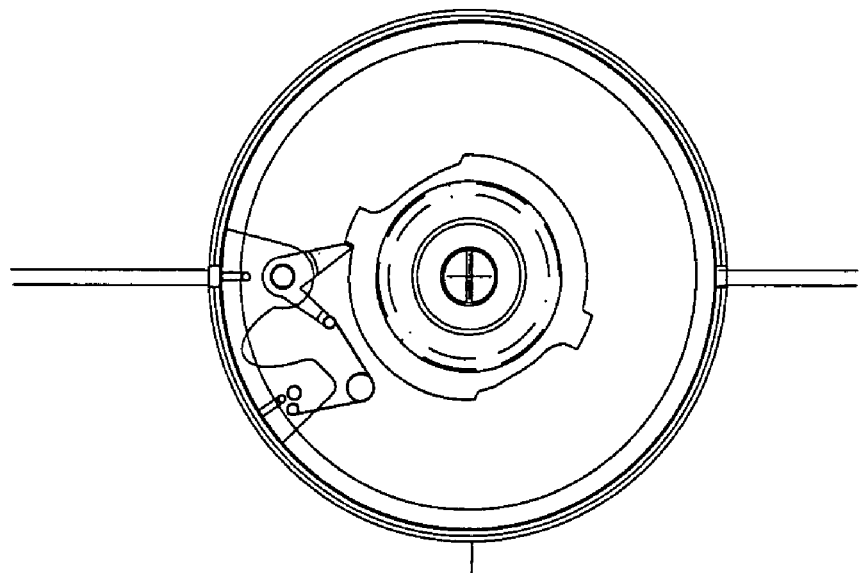
FIG. 4 illustrates a diagram of drawing out the cords of a reel according to an embodiment of the invention.
Figure 4:
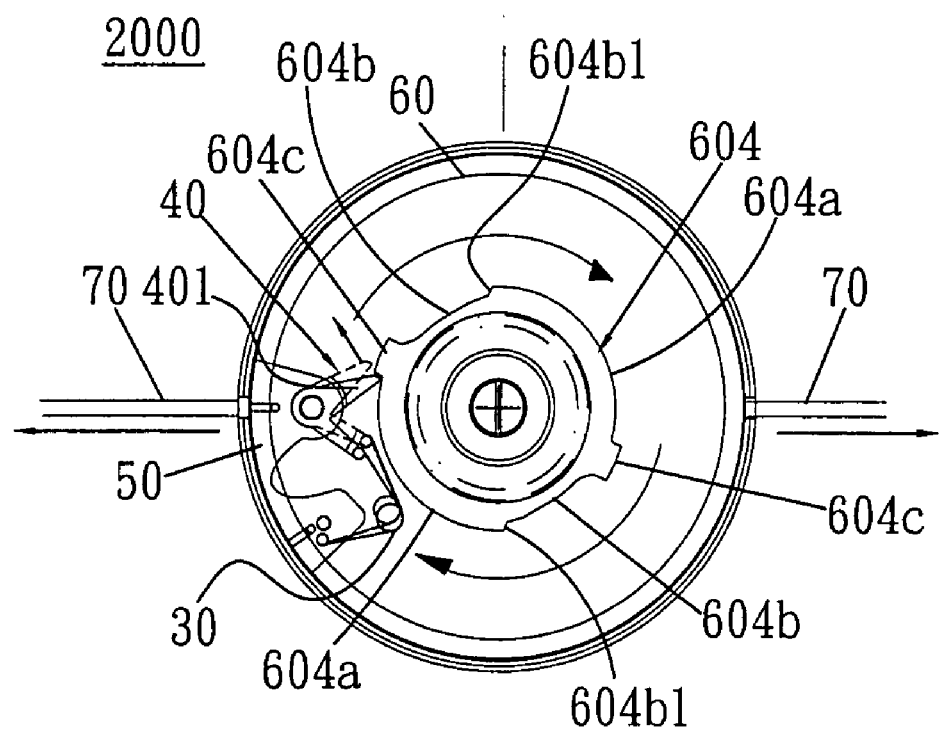
Figure 5:
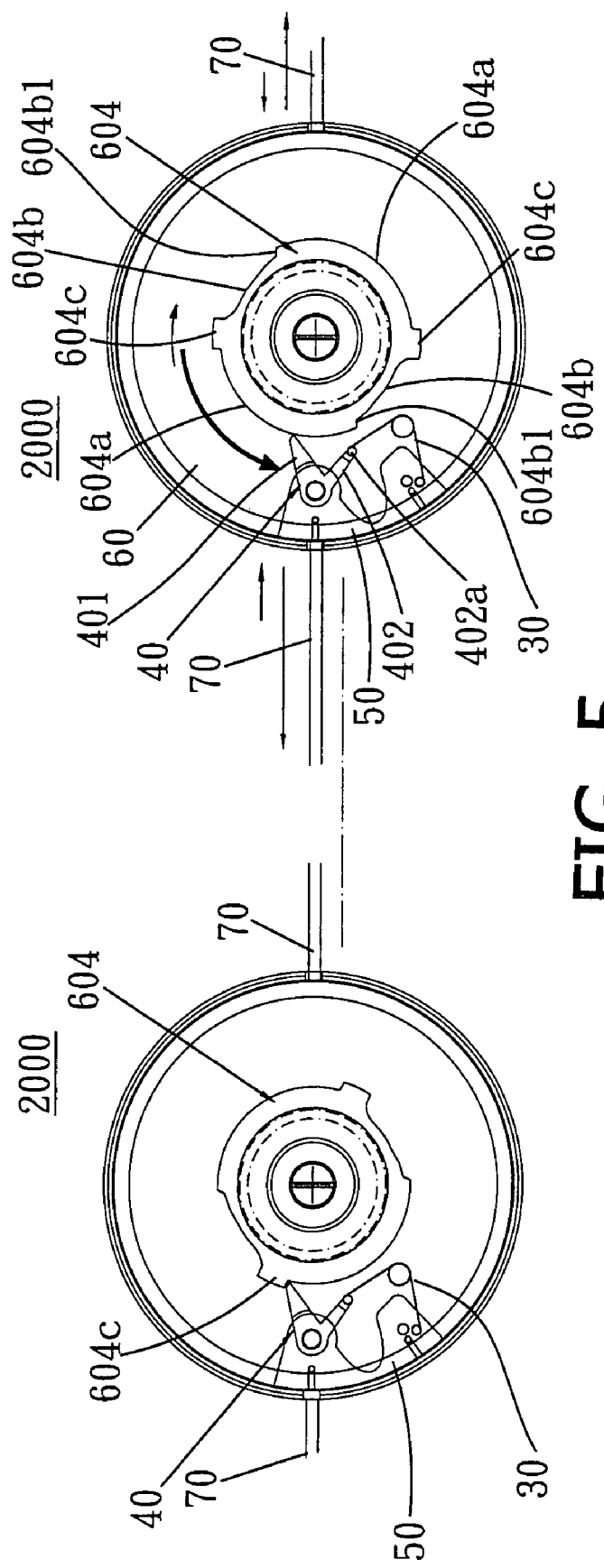
FIG. 5 illustrates a diagram of locating the cords of a reel after drawing out the cords according to an embodiment of the invention.
Figure 6:
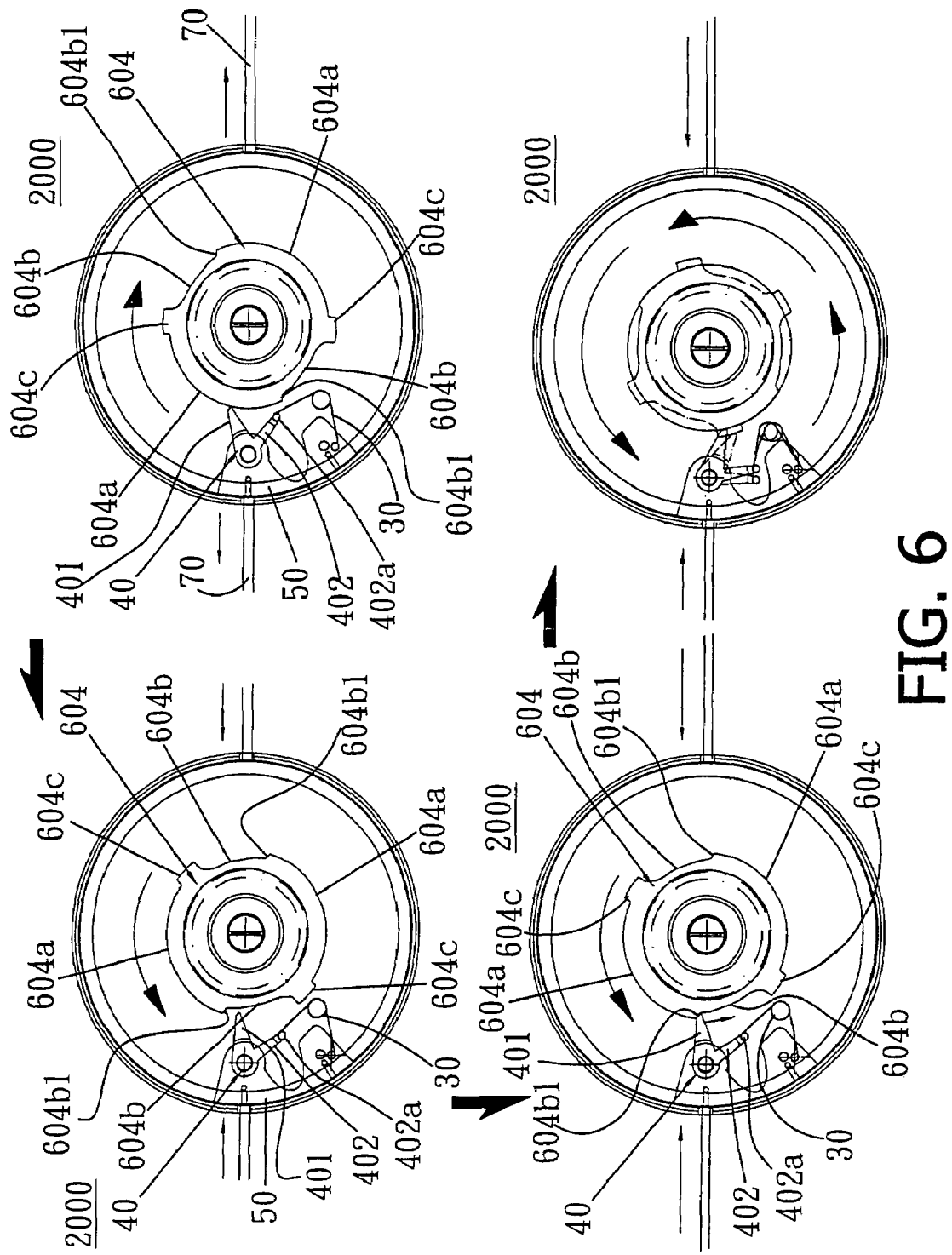
FIG. 6 illustrates a diagram of rolling up the cords of a reel according to an embodiment of the invention.

Referring to FIG. 4, while the rotating disc 60 is turned by pulling the cord 70 on one side of the reel 2000, the cord 70 on the other side is reeling out synchronously. Because the movable tracks 604a and the bumps 604c of the track assembly 604 on the rotating disc 60 rub against and push each other constantly to move the tip of the movable arm 401 of the movable arm assembly 40 aside, the rotating disc 60 continues rotating smoothly. Therefore, the cords 70 can be drawn out in determined length. Meanwhile, the coil spring 80 disposed in the middle of the surrounding wall 602 on the rotating disc 60 is reeled in towards the center, so as to create a reversed tension. Now referring to FIG. 5, after the cords 70 with determined length are drawn out, the rotating disc 60 is turned again by pulling the cord 70 gently. The bumps 604c of the track assembly 604 thus pass the tip of the movable arm 401. Thereafter, the cord 70 is set free to release the reversed tension from the coil spring 80 so that the rotating disc 60 is turned in an opposite direction, and the bump 604c leans against the tip of the movable arm 401 and then fixed. Referring to FIG. 6, in order to rolling up the cords 70, the cord 70 is pulled to make the movable tracks 604a rub against the bumps 604c of the track assembly 604 on the rotating disc 60. When the rotating disc 60 is rotated and the switchable track 604b is not blocked by the tip of the movable arm 401, the friction between the tip of the movable arm 401 and the movable track 604*a* is converted to the counterforce force arising from the interaction between the movable arm 401 and the spring 30. Thereby, the movable arm 401 springs into the switchable track 604*b*. Then, the cord 70 is set free to release the reversed tension from the coil spring 80 so that the rotating disc 60 is turned in an opposite direction. The counter surface 604*b*1 of the switchable track 604*b* of the track assembly 604 pushes the tip of the movable arm 401 to form a space for the smooth progress of the movable tracks 604*a* and the bumps 604*c* of the track assembly 604. Accordingly, the rotating disc 60 is quickly rotated to wind the cords 70.

In accordance with the description above, the reel structure possesses the desirable benefits and effects. The structure is not known to the public, and has utility and novelty. It is appreciated if the application is examined and granted.

The aforementioned embodiments of the present invention are intended to be illustrative only. Numerous alternative embodiments may be devised by those skilled in the art without departing from the scope of the following claims.

What is claimed is:

1. An improved reel structure comprising:
   a base having two openings, an axial pillar on the base, a column spaced apart from the axial pillar, a plurality of plugs on the base, a support with a groove disposed in a middle of the base, and a bulged ring on the base;
   a substantially V-shaped spring; a movable arm assembly including a movable arm with an axial hole in a lower portion of the movable arm and equipped with a spring arm and a stud on one side of the movable arm;
   a clasper with a concave middle portion and including a plurality of fastening holes corresponding to the axial pillar, the column and the plugs;
   a rotating disc with an axial center hole and including a surrounding wall disposed on an upper portion of the rotating disc for accommodating two cords in the manner that the two cords being rolled along the outside of the surrounding wall in a same direction, wherein the rotating disc further includes a coil spring positioned in a middle of the surrounding wall, a bugled ring and a bugled track assembly disposed at a middle bottom of the rotating disc, the bugled track assembly including two cambered movable tracks, two concave switchable tracks and two bumps connected therewith, the switchable track having a counter surface for pushing; and
   a cap with two openings;
   wherein the axial pillar on the base is inserted into the axial hole of the movable arm assembly, one end of the spring is attached to the column of the base, and the other end is coupled to the stud disposed on the spring arm of the movable arm assembly;
   the fastening holes of the clasper respectively mate with the axial pillar, the column and the plugs, so as to avoid separating the movable arm assembly from the spring and to allow some movement therebetween;
   the support on the base is inserted into the axial hole of the rotating disc such that the rotating disc is rotatable about the support;
   an inner portion of the coil spring disposed in the middle of the surrounding wall on the rotating disc is inset in the groove of the support; and
   the cap substantially covers the base, the cords extending from the openings of the cap and the openings of the base.

\* \* \* \* \*